Patented Feb. 15, 1949

2,461,901

UNITED STATES PATENT OFFICE 2,461,901

SULFURIZED PHENOLIC TANNING AGENTS AND THEIR MANUFACTURE

Valentin Kartaschoff, Basel, Switzerland, assignor to Sandoz Ltd., Fribourg, Switzerland, a Swiss firm No Drawing. Application September 6, 1944, Serial No. 552,928. In Switzerland September 30, 1943

4 Claims. (Cl. 260—48)

The present invention relates to new tanning agents which are stable to light and to a process for their manufacture.

Heretofore a great number of processes have become known which describe the preparation of known non-dyeing thio-derivatives of phenols, cf. for example U. S. Letters Patents 1,450,463; 1,928,257; 1,931,197; 1,943,179; 1,989,989 and others. The metal-free as well as metal-containing thio-derivatives of phenols being almost colorless and prepared according to these processes are easily soluble in water in form of their sodium salts in the presence of an excess of alkali and are used as tanning agents for mordanting cotton and artificial silk before dyeing the same with basic dyestuffs. In view of the fact that these products possess tanning properties they can also be used as reserving agents against acid dyestuffs on animal fibres. However all the said compounds are insufficiently stable toward inorganic acids and can, therefore, not be used for the purpose of tanning leather, as they tan very rapidly only the surface of the leather, but do not penetrate in its midst.

It is further known that by treating thio-derivatives of phenols with alkali metal sulphites in the presence of oxidising agents it becomes possible to introduce a certain amount of sulphuric acid groups into these compounds. The products thus obtained possess an improved stability toward organic acids, but they are quantitatively precipitated on addition of even diluted inorganic acids. For this reason they cannot be used as tanning agents for leather, as they do not penetrate into the interior thereof.

It has now been found that colorless thio-derivatives of phenols possessing strong tanning properties and being easily soluble in water and completely stable toward mineral acids can be prepared, when metal-free or metal-containing non-dyeing thio-derivatives of phenols are treated with oxygen under pressure in the presence of an excess of an alkali and, in some cases, of sulphites and catalysts facilitating the oxidation. As starting products there may be used thio-derivatives of phenols prepared from phenols and their homologues, water-soluble phenolaldehyde condensation products or phenol-derivatives of the type of dihydroxydiphenylmethane, dihydroxydiphenylpropane, dihydroxydiphenylsulphone and the like, by heating these compounds with sulphur in the presence of an alkali or by treating the same with sulphur chloride, if desired in the presence of metal salts. The oxidation of the thio-derivatives is preferably carried out in an aqueous solution in the presence of sodium or potassium hydroxide and at a pressure of about 5 atm., until no further absorption of oxygen takes place. It is advantageous to work at temperatures over 100° C., for instance at 130°–150° C. Often, it is of great advantage to add to the reaction solution catalysts, like copper or vanadium salts, which accelerate the rapidity of the oxidation and in some cases make it possible to work at lower temperatures. The addition of sulphites also increases the rapidity of the oxidation. After completion of the oxidation the new products are salted out after having acidulated the solution, or the solution itself is evaporated to dryness. In this manner generally nearly colorless powders will be obtained which are easily soluble in water and cannot be precipitated from the solutions by mineral acids, like sulphuric or hydrochloric acid.

The new products possess strong tanning properties and diffuse throughout the leather to be tanned. The tanned leather thus produced possesses a full touch and a good stretch and, in contradistinction to the known natural and synthetical tanning agents, a greatly improved fastness to light. From the starting products the new tanning compounds are insofar different in their properties as they do not precipitate the basic dyestuffs and, therefore, cannot be used as mordants.

The following examples, wherein the parts are by weight, illustrate the present process, without being limited thereto.

Example 1

180 parts of phenol, 200 parts of water, 80 parts of sodium hydroxide and 170 parts of sulphur powder are heated under reflux in a leaded autoclave for 30 hours to about 103° C., whereby great quantities of hydrogen sulphide evolve. After the sulphurisation has finished the mass is dissolved in 1000 parts of water with addition of 80 parts of sodium hydroxide and oxidised with technical oxygen under a pressure of 10–12 atm. for 20–22 hours at 125°–135° C. After this time the absorption of oxygen is practically finished. The solution is then filtered and evaporated to dryness. A greyish water-soluble powder fast to acids and containing 52% of tanning substance, will thus be obtained. The tanning compound can be isolated in pure form by acidulating the solution, until a strong acid reaction to Congo red paper has been reached, and by salting out the compound in the heat. In this manner a greyish powder containing 90–95% of tanning substance will be obtained. Leather tanned with this product possesses an excellent fastness to light, a full touch and good elasticity.

Example 2

100 parts of the free acid prepared according to Example 1 of the U. S. Letters Patent 1,450,463 are dissolved in 1000 parts of water, while adding 45 parts of sodium hydroxide, and oxidised in an autoclave at 140°–145° C. under a pressure of 12 atmospheres. When no further oxygen is absorbed, the solution is filtered and evaporated to dryness. Thus a clear grey powder with strong tanning properties will be obtained.

Example 3

190 parts of phenol are dissolved together with 80 parts of sodium hydroxide in 200 parts of water and after addition of 100 parts of sulphur powder heated for 30 hours to 103°–107° C. The resulting melt is diluted with 500 parts of water, then 40 parts of sodium hydroxide are added thereto and treated with oxygen in an autoclave at 8–10 atmospheres and at 145°–155° C. After completion of the oxidation the slightly acid solution thus obtained is filtered and evaporated to dryness. A grayish powder possessing strong tanning properties will be obtained.

Example 4

180 parts of phenol are melted with addition of 20 parts of water and 2 parts of 35% hydrochloric acid and treated at 30°–35° C. with good stirring with 80 parts of a 30% formaldehyde solution. The water is separated from the clear brown condensation product thus obtained and the latter treated with good stirring with 60 parts of sodium hydroxide. To the thick mass thus obtained are added 100 parts of sulphur and the mixture heated in a reflux condenser for 20 hours at 115°–117° C. The resulting melt is then dissolved in 1000 parts of water under addition of 80 parts of sodium hydroxide and oxidised at 120°–130° C. with a pressure of 10 atmospheres. After the oxygen has been absorbed, the solution is filtered and the tanning agent isolated by evaporating the solution to dryness or by precipitation by means of salt after acidulation of the solution. A reddish powder possessing strong tanning properties will be obtained.

Example 5

125 parts of p:p'-dihydroxydiphenyl sulphone are dissolved with addition of 60 parts of sodium hydroxide in 100 parts of water and 64 parts of sulphur are added to the solution. This charge is then heated during 24 hours at 106°–107° C. After the sulphurisation is complete, the reaction product is dissolved in water and the free acid of the thio-compound is precipitated by means of acidulation with hydrochloric acid. 100 parts of the free acid thus obtained are dissolved in 1000 parts of water in the presence of 80 parts of sodium hydroxide and oxidised with oxygen at 135°–140° C. under a pressure of 12–14 atmospheres. After filtration and evaporation a greyish powder possessing strong tanning properties will be obtained.

Example 6

100 parts of the tin-containing thio-derivative of phenol prepared according to Example 2 of the U. S. Letters Patent 1,928,257 are dissolved in the presence of 20 parts of sodium hydroxide in 100 parts of water and treated with oxygen under a pressure of 10–12 atmospheres at 130°–155° C. until the absorption of oxygen is complete. The slightly acid solution thus obtained is filtered and evaporated to dryness. A yellowish powder containing tin in complex linkage, being easily soluble in water and possessing strong tanning properties is thus obtained.

A similar antimony-containing product will be obtained, if the thio-derivative prepared according to Example 3 of the above cited U.S. Letters Patent is subjected to the above described treatment.

Example 7

90 parts of phenol, 60 parts of sodium hydroxide, 60 parts of sulphur, 40 parts of chromium sulphate and 100 parts of water are heated under reflux for 30 hours to 107°–108° C. and the condensation product thus obtained is oxidised under a pressure of 12–15 atmospheres at 140°–145° C. After filtration and evaporation to dryness a brownish hygroscopic powder, which is easily soluble in water and which contains chromium in complex linkage will be obtained. It possesses strong tanning properties.

Example 8

100 parts of the tin-containing condensation product, prepared according to Example 1 of the U. S. Letters Patent 1,931,197 are dissolved in 750 parts of water in the presence of 80 parts of sodium hydroxide and 100 parts of sodium bisulphite and treated with oxygen at a pressure of 10–12 atmospheres at 140°–150° C. The neutral solution is then filtered and evaporated to dryness. A clear tin-containing powder possessing strong tanning properties will be obtained.

What I claim is:

1. A process for the manufacture of a tanning agent which comprises heating a high-molecular non-dyeing sulphurized phenol with molecular oxygen at a temperature of 120–155° C. and at a pressure of 5 to 15 atmospheres in an aqueous alkaline solution containing free sodium hydroxide until the taking up of the oxygen has ceased.

2. A process for the manufacture of a tanning agent which comprises heating a high-molecular non-dyeing sulphurized phenol, containing tin in complex linkage, with molecular oxygen at a temperature of 120–155° C. and at a pressure of 5 to 15 atmospheres in an aqueous alkaline solution containing free sodium hydroxide until the taking up of the oxygen has ceased.

3. A tanning agent obtained by the process of claim 1 and consisting of a high-molecular non-dyeing sulphurized phenol which is, in dry state, a light colored powder, easily soluble in water and which is not precipitated from its aqueous solution by mineral acid and possesses good stability to light.

4. A tanning agent obtained by the process of claim 1 and consisting of a high molecular non-dyeing sulphurized phenol, containing tin in complex linkage, which is, in dry state, a light colored powder, easily soluble in water and which is precipitated from its aqueous solution by mineral acid and possesses good stability to light.

VALENTIN KARTASCHOFF.

REFERENCES CITED

The following references are of record in the file of this patent:

UNITED STATES PATENTS

| Number | Name | Date |
|---|---|---|
| 1,931,197 | Kartaschoff | Oct. 17, 1933 |

FOREIGN PATENTS

| Number | Country | Date |
|---|---|---|
| 388,628 | Germany | Jan. 19, 1924 |